United States Patent
Reeves et al.

(10) Patent No.: US 7,208,023 B2
(45) Date of Patent: Apr. 24, 2007

(54) DRY DUST CONTROL MATERIALS

(75) Inventors: Robert A. Reeves, Arvada, CO (US); Charlie W. Kenney, Littleton, CO (US); Dennis Johnson, Arvada, CO (US)

(73) Assignee: Hazen Research, Inc., Golden, CO (US)

( * ) Notice: Subject to any disclaimer, the term of this patent is extended or adjusted under 35 U.S.C. 154(b) by 277 days.

(21) Appl. No.: 10/367,576

(22) Filed: Feb. 14, 2003

(65) Prior Publication Data

US 2003/0178598 A1 Sep. 25, 2003

Related U.S. Application Data

(60) Provisional application No. 60/357,540, filed on Feb. 15, 2002.

(51) Int. Cl.
*C10L 10/00* (2006.01)
*C10L 5/00* (2006.01)
*B03C 7/00* (2006.01)

(52) U.S. Cl. .......................... 44/602; 44/620; 252/88.1; 209/130

(58) Field of Classification Search .................. 44/602, 44/620; 252/88, 88.1; 209/130
See application file for complete search history.

(56) References Cited

U.S. PATENT DOCUMENTS

| | | | | |
|---|---|---|---|---|
| 2,139,398 A | * | 12/1938 | Allen | .......................... 44/600 |
| 2,176,129 A | * | 10/1939 | Fife | .............................. 44/602 |
| 4,198,061 A | | 4/1980 | Dunn | ........................... 274/47 |
| 4,260,394 A | * | 4/1981 | Rich | ............................. 44/624 |
| 4,335,419 A | | 6/1982 | Hastings | ..................... 361/228 |
| 4,780,233 A | | 10/1988 | Roe | ............................... 252/88 |
| 5,163,983 A | | 11/1992 | Lee | ................................ 55/104 |
| 5,172,638 A | | 12/1992 | Mathison et al. | ............ 104/7.3 |
| 5,439,608 A | | 8/1995 | Kondrats | ...................... 252/88 |
| 5,607,497 A | | 3/1997 | Brown | ............................. 95/3 |
| 5,637,122 A | * | 6/1997 | Brown | ......................... 44/505 |
| 5,958,112 A | | 9/1999 | Nojima | .......................... 96/55 |
| 6,110,656 A | | 8/2000 | Eichorst et al. | ............. 430/527 |
| 6,207,255 B1 | | 3/2001 | Fukuura et al. | ............. 428/175 |
| 6,514,332 B2 | * | 2/2003 | Varnadoe et al. | ........... 106/269 |

* cited by examiner

*Primary Examiner*—Cephia D. Toomer
(74) *Attorney, Agent, or Firm*—Sheridan Ross P.C.

(57) ABSTRACT

The present invention discloses methods to reduce dusting in bulk materials, such as coal. The method includes mixing with the bulk material either a fraction of the bulk material having an electrostatic charge opposite that of the remainder of the bulk material or a heterologous charge control agent having an electrostatic charge opposite that of the bulk material. The attractive forces between the opposite electrostatic charges agglomerate dust particles to larger particles that quickly settle to control dusting. Also disclosed are materials produced by the methods described above.

9 Claims, 2 Drawing Sheets

DRY DUST CONTROL MATERIALS

CROSS-REFERENCE TO RELATED APPLICATION

This application claims priority under 35 U.S.C. § 119(e) from U.S. Provisional Application Ser. No. 60/357,540 filed Feb. 15, 2002, entitled "Dry Dust Control Materials," which is incorporated herein by reference.

FIELD OF INVENTION

The present invention relates to methods of suppressing dust produced by handling bulk materials such as coal, ore, crushed rock, fertilizer, clay, grain and coke.

BACKGROUND OF THE INVENTION

Producing, handling and storing bulk materials such as coal, ore, crushed rock, fertilizer, clay, grain and coke creates dust. Dust emissions add significant costs to mining, handling, and storing bulk materials such as coal, aggregate, and ore. Dust is noxious and can be dangerous if the material is flammable. There are many examples of coal and grain dust explosions that have taken lives and destroyed property. Dust is easily carried by the wind, creating toxic or unsightly conditions. Many handling operations have long recognized the fugitive dust problems and have imposed strict controls that can limit the capacity of a material handling facility.

Industry typically mitigates dust by applying water sprays at transfer points to agglomerate the dust. Costly chemicals such as foaming agents and surfactants may be added to the water to increase effectiveness. Numerous patents have been granted for specific dust suppression chemicals. For example, U.S. Pat. No. 5,310,494 (Method for controlling dusting of coke and coal, Bennett; Robert P., May 10, 1994) teaches that a foaming agent consisting of polyacrylate and lignosulfonate significantly reduces the amount of water required to control fugitive dust.

Traditional dust suppression methods have limited effectiveness for at least two reasons. First, dust created by friction and impact after the application may not be effectively controlled, so repeated applications may be required at each transfer point in the material handling process. Second, the water or chemical sprays evaporate, allowing dust to become airborne.

Water and chemical sprays dilute or contaminate the bulk material. For example, a small addition of 1 weight percent addition of water to coal will reduce its useful heating value by over 100 BTU/lb. Added water in cold weather creates ice that causes costly material handling problems.

Therefore, there remains a need in the art for improved methods of dust control that have greater effectiveness and avoid the problems associated with water and chemical sprays.

SUMMARY OF THE INVENTION

One embodiment of the present invention is a method to control dusting in a bulk material wherein the bulk material has a first electrostatic charge. The method includes separating the bulk material into first and second fractions and imparting a second electrostatic charge to the first fraction. The second electrostatic charge is opposite the first electrostatic charge. The first and second fractions are then mixed. In this manner, the attractive forces between the opposite electrostatic charges agglomerate dust particles to larger particles that quickly settle to control dusting. The present invention is suitable for use with a wide variety of bulk materials. For example, the bulk material can be a bulk fuel material, such as coal, which can be selected from bituminous coal, sub-bituminous coal, and lignite. In one preferred embodiment, the first fraction is less than about 20% by weight of the bulk material. In addition, the method can include reducing the particle size of the first fraction to less than about 2.0 mm before the step of imparting.

The step of imparting can include placing the first fraction in an electrostatic field of at least about 1 kV/cm and raising the temperature of the first fraction in the electrostatic field to between about 30° C. and about 300° C. Further, the first fraction is then maintained in the electrostatic field and at the raised temperature for between about 5 minutes and about 600 minutes. In another embodiment, the step of imparting an electrostatic charge can include treating the first fraction with a corona discharge.

In a preferred method of the present invention, a solid particulate material is treated by separating it into first and second fractions, wherein the first fraction is less than about 10% of the total material. The particle size of the first fraction is reduced to about 0.5 mm and the first fraction is placed in an electrostatic field of at least about 1 kV/cm. The temperature of the first fraction in the electrostatic field is raised to between about 30° C. and about 300° C., and the first fraction is maintained in the electrostatic field and at the raised temperature for between about 5 minutes and about 600 minutes. The first fraction is then cooled to ambient temperature while maintaining the electrostatic field, which is removed when the material temperature is at ambient temperature. The first and second fractions are then mixed.

In another embodiment of the present invention, dusting in a bulk material having a first electrostatic charge is controlled by mixing a heterologous charge control agent with the bulk material. The heterologous charge control agent has a second electrostatic charge opposite that of the first electrostatic charge. Further, the amount of the heterologous charge control agent is between about 0.1% and about 20% by weight of the bulk material. The heterologous charge control agent can be selected from toner, titanium dioxide, coal, plaster of Paris, pitch coal blend, and sodium orthophosphate.

In an alternative embodiment, the charge control agent can be treated to impart the second electrostatic charge opposite the first electrostatic charge. Such treatment can include placing the charge control agent in an electrostatic field of at least about 1 kV/cm, raising the temperature of the charge control agent to between about 30° C. and about 300° C., and maintaining the charge control agent in the electrostatic field and at the raised temperature for between about 5 minutes and about 600 minutes. The charge control agent can have either a net positive electrostatic charge or a net negative electrostatic charge.

Further embodiments of the present invention include bulk materials and particulate materials having the characteristics of materials produced by the various methods of the present invention.

BRIEF DESCRIPTION OF THE FIGURES OF THE INVENTION

DETAILED DESCRIPTION OF INVENTION

Figure 1:
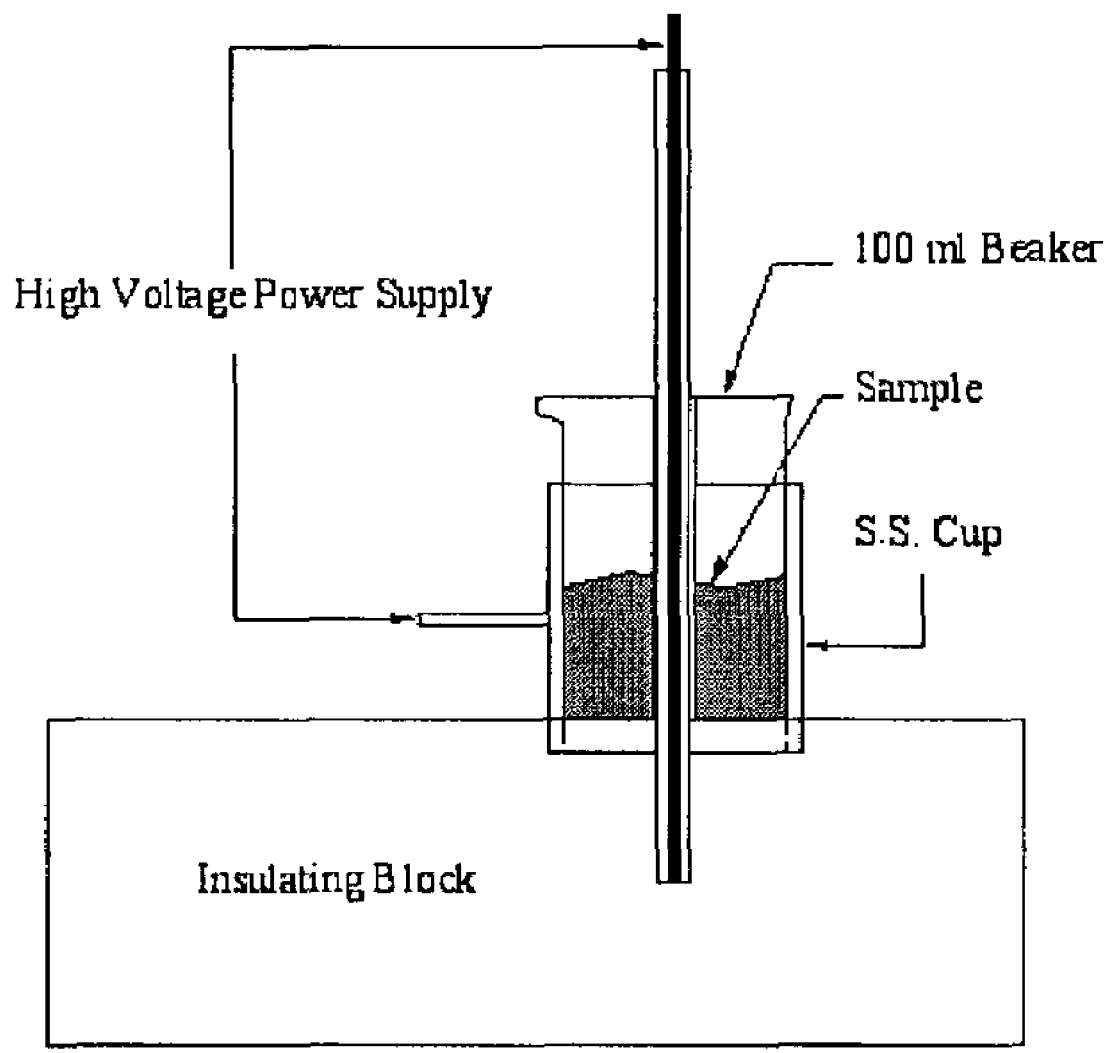
FIG. 1 is an illustration of a cup charging apparatus.

A novel method of dust control is described herein that avoids the problems described above with conventional dust control methods. The invention imparts electrostatic charges to a portion of the bulk material or to a heterologous charge control agent and the resulting attractive forces agglomerate dust particles to larger particles that quickly settle. The invention has a number of attendant advantages. The resultant mixture possesses less dust than untreated material without further treatment until the material is moved to market and consumed. The electrostatic charges remain effective from the point of application to the end use of the bulk material and therefore subsequent treatment of dust control is reduced or avoided altogether. In addition, when a portion of the bulk material is used, no change in the composition of the bulk material occurs during implementation of the invention. Compared to present methods of dust control, the present method is lower cost, and provides a more durable treatment, greater overall effectiveness, and preservation of product quality.

Undesirable and excessive dust problems occur because electrostatic charges are normally produced when a bulk material, such as coal, is moved on conveyors and past bins and hoppers. Most particles, including dust, take on the same net electrostatic charge during handling, and since particles of like electrostatic charge repulse each other, dispersing the dust particles. The present invention overcomes the natural tendency for materials to disperse dust by imparting an electrostatic charge, opposite that of the natural electrostatic charge of the bulk material, to a portion of the bulk material. As used herein, the term "dusting" refers to the phenomenon of small particulate matter in a bulk material becoming airborne during production, handling or storage of the bulk material.

As used herein, the term "bulk material" refers to any solid materials that are produced, shipped and/or stored in quantities that are generally measured on a tonnage basis and that can be fractionated or separated by size. Bulk materials can include, for example, solid fuel materials, bulk food products, sulfide ores, carbon-containing materials, such as activated carbon and carbon black, and other minerals and ores.

As used herein, the term "solid or bulk fuel material" generally refers to any solid material that is combusted or otherwise consumed for a useful purpose. More particularly, solid fuel materials can include, for example, coal, upgraded coal products, and other solid fuels, including coke and other thermally treated fuel material. The term "coal" as used herein includes anthracite, bituminous coal, sub-bituminous coal and lignite. The present invention is particularly suited for bituminous coal, sub-bituminous coal and lignite. The term "upgraded coal products" includes thermally upgraded coal products, coal products produced by beneficiation based on specific gravity separation, mechanically cleaned coal products, and coal products such as stoker, breeze, slack and fines.

Examples of other solid fuels included, without limitation, oil shale, solid biomass materials, refuse derived fuels (including municipal and reclaimed refuse), coke, char, petroleum coke, gilsonite, distillation byproducts, wood byproducts and their waste, shredded tires, peat and waste pond coal fines. The term "refuse derived fuels" can include, for example, landfill material from which non-combustible materials have been removed. Examples of ores and minerals that are mined include, without limitation, ores (such as sulfide ores), gravel, rocks, crushed rocks and limestone. Limestone, for example, is particularly useful in cement manufacture, road construction, rail ballast, soil amendment or flue gas sorbent used in sulfur dioxide removal at coal-fired power plants.

Examples of bulk food products include, for example, bulk grains, animal feed and related byproducts. The term "bulk grains" include, for example, wheat, corn, soybeans, barley, oats and any other grain that are transported and/or stored.

In one embodiment, the present invention is a method to control dusting in a bulk material in which the bulk material has a first electrostatic charge. The bulk material is separated into first and second fractions and a second electrostatic charge, opposite the first electrostatic charge, is imparted to the first fraction. The electrostatic charge, i.e., the polarity of the charge, of a material can be readily determined by those skilled in the art, such as by use of a Faraday cup. Then the first and second fractions are mixed. Because the treated first fraction has a electrostatic charge opposite that of the bulk material in the second fraction, any dust is immediately attracted to the treated material and agglomerated. In this embodiment, the first fraction is typically less than about 20% by weight of the total bulk material, more preferably less than about 15%, and more preferably less than about 10%. In further embodiments, the particle size of the first fraction can be reduced, such as by crushing or sorting to less than about 2.0 mm before the step of imparting, more preferably less than about 1.0 mm, more preferably less than about 0.5 mm, and more preferably less than about 0.1 mm.

The step of imparting a second electrostatic charge to the first fraction can be conducted in any manner known to those of skill in the art. Field strength, temperature and time are material and application specific and can be determined by those skilled in the art in view of the disclosure herein. The imposed electrostatic charge, opposite that of the bulk material, remains for days, if not weeks, after the treated material is cooled to ambient temperature. New dust generated by friction and attrition after the initial application is attracted to the treated material. Sufficient treated material is produced to agglomerate the anticipated dust generated for the life of the product. For example, the first fraction can be placed in an electrostatic field of at least about 1 kV/cm, and the temperature of the first fraction in the electrostatic field raised to between about 30° C. and about 300° C. The first fraction can be held under these conditions for a time between about 5 minutes and about 600 minutes. The material is then cooled to ambient temperature while maintaining the electrostatic field, at which time the eletrostatic field is disengaged. In another embodiment, the step of imparting a second electrostatic charge to the first fraction can be accomplished by treating the first fraction with a corona discharge.

A particular embodiment of the present invention is a method of treating a solid particulate material that includes separating the material into first and second fractions, with the first fraction being less than about 10% of the total material and reducing the particle size of the first fraction to less than about 0.5 mm. The first fraction is then placed in an electrostatic field of about 1 kV/cm or more and the temperature of the first fraction in the electrostatic field is raised to between about 30° C. and about 300° C. The first fraction is maintained under these conditions for between about 5 minutes and about 600 minutes before being cooled to ambient temperature while maintaining the electrostatic field. Then the first fraction is removed from the electrostatic field when the material temperature is at ambient temperature and mixed with the second fraction.

In another embodiment of the present invention, a method to control dusting in a bulk material having a first electrostatic charge is provided. The method includes mixing a heterologous charge control agent with the bulk material, wherein the heterologous charge control agent has a second electrostatic charge opposite that of the first electrostatic charge. Typically, the amount of the heterologous charge control agent is between about 0.1% and about 20% by weight of the bulk material.

The heterologous charge control agent is a material having a different chemical makeup than the bulk material. Another characteristic of a charge control agent is that it has an electrostatic charge opposite that of the electrostatic charge of the bulk material. Thus, the charge control agent can have a net positive or negative electrostatic charge, depending on the charge of the bulk material. For example, the charge control agent can have a static electrical charge produced by frictional forces from mixing that impart static charges, this phenomena is referred to as a triboelectric charging. Alternatively, the charge control agent can possess a durable electrostatic charge that is stronger than charges produced by mixing. Materials that possess permanent, durable static charges are called electrets. Electrets are manufactured materials that gain electrical charges by an intense electrical field or a corona discharge. Analogous to permanent magnets, electrets are routinely used in xerographic toners, electrostatic filters, and other electronic devices. Electrets tested as dust suppression agents include xerographic toner powder and materials charged in a strong electrostatic field. In preferred embodiments, the heterologous charge control agent can be toner, titanium dioxide, coal, plaster of Paris, pitch coal blend, or sodium orthophosphate.

In a particular embodiment, the heterologous charge control agent can be mixed first with only a portion of the bulk material with the resulting mixture then being mixed with the remaining portion of the bulk material. In this manner, the charge control agent can be more evenly and uniformly mixed throughout the bulk material. For example, the charge control agent can be mixed with a first portion of the bulk material that is between about 0.5% and about 25% of the bulk material. This mixture is then mixed with the remaining portion of the bulk material.

The dust suppression effect of the treatment of materials in accordance with the methods of the present invention is durable. In preferred embodiments, the suppression effect continues for at least about 50 hours after initial treatment, more preferably at least about 100 hours, more preferably at least about 200 hours and more preferably at least about 300 hours.

Further embodiments of the present invention include bulk materials and solid particulate materials having the characteristics of the materials produced by methods of the present invention described herein, including the materials produced by such methods.

The following examples are provided for purposes of illustration and are not intended to limit the scope of the present invention.

EXAMPLES

Thirty-one experiments were conducted to evaluate various methods of the present invention in the mitigation of dust produced by samples of Powder River Basin (PRB) subbituminous coal.

Equipment.

Figure 2:
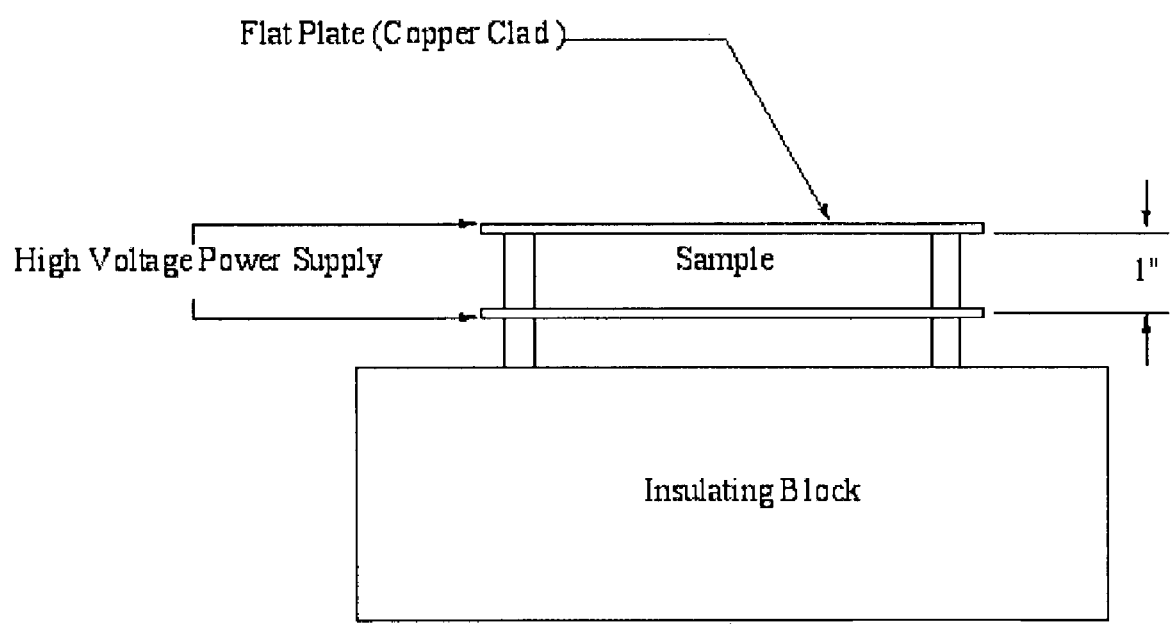
FIG. 2 is an illustration of a flat plate charging apparatus.

The experiments described below used a top loading balance, pans, riffle splitter, two fabricated charging devices and an optical static dust tester. One of the charging devices, a cup charge apparatus, is shown in FIG. 1 and the other, a flat plate charge apparatus, is shown in FIG. 2. The two charging devices were powered with a Bertran Model 935 high-voltage power supply (0 to 30 kV DC)

Materials.

Coal Sample.

A fresh sample of 3-inch by 0 subbituminous coal obtained from a mine in the southern PRB was used for the tests. An analysis of the sample is listed in Table 1. Approximately 5 kg of sample was partially dried at 50° C. for 1 hr to remove visible surface moisture, crushed in a hammer mill to minus 8 mesh, and riffled into 200-g lots. The 200-g lots were sealed in plastic bags for use. The particle size distribution of the minus 8-mesh lots was obtained by dry screen analysis. Results are listed in Table 2.

TABLE 1

Analysis of PRB Coal Used in Tests (As-received Basis)

| Parameter | Value |
| --- | --- |
| Moisture, % | 27.08 |
| Ash, % | 5.43 |
| Sulfur, % | 0.32 |
| Higher Heating Value, Btu/lb | 8,851 |

TABLE 2

Particle Size Distribution (Dry Screen)

| Screen Aperture Tyler Screen Mesh | | Direct Values | |
| --- | --- | --- | --- |
| Passing | Retained | Weight, g | Weight, % |
|  | 6 | 0.0 | 0.0 |
| 6 | 14 | 129.4 | 33.5 |
| 14 | 28 | 131.0 | 33.9 |
| 28 | 48 | 65.4 | 16.9 |
| 48 | 100 | 33.5 | 8.7 |
| 100 | Pan | 27.3 | 7.1 |

Dust Control Agents.

Eight dry, finely powdered materials were tested as dust control agents. Table 3 lists the materials used in the tests.

TABLE 3

Dry Dust Control Agents

| Material | Description |
| --- | --- |
| Toner | Photocopier Toner |
| Titanium Dioxide | Dupont, TI-PURE |
| Type C Fly Ash | Coal-fired Power Plant |
| Type F Fly Ash | Coal-fired Power Plant |
| 28- by 48-mesh PRB Coal | Screenings, Raw Untreated |
| 28- by 48-mesh PRB Coal (Treated) | Screenings, Charged at 20 kV, 40° C., 15 min in Cup Apparatus |
| Plaster of Paris | Raw Powder |
| Plaster of Paris (Treated) | Raw Powder, Charged at 27 kV, 20° C., 15 min in Cup Apparatus |
| Pitch Coal Blend | Minus 30 Mesh |
| Pitch Coal Blend (Treated) | Minus 30 Mesh, Charged at 9 kV, 20° C., 1 hr in Flat Plate Apparatus |

TABLE 3-continued

Dry Dust Control Agents

| Material | Description |
|---|---|
| $Na_3PO_4 \cdot 12H_2O$ | Minus 14-mesh Crystals |
| $Na_3PO_4 \cdot 12H_2O$ (Treated) | Minus 14-mesh Crystals, Charged at 20 kV, 20° C., 15 min in Cup Apparatus |

Procedures.

The following five-step procedure was used to prepare and measure the dustiness of each coal sample:

1. Weigh out 200 g of the minus 8-mesh coal sample in a pan.
2. Weigh out the specified weight of dust control agent.
3. Combine the coal and dust control agent and pass the materials through a riffle splitter five times to homogenize the mixture.
4. Place the homogenized mixture in the optical static dust tester feed hopper and conduct the dustiness test. Record the light transmission values at 15, 30, 60, 120, and 300 seconds. Extend the period to 600 seconds if the sample is dusty and the transmission is less than 90% at 300 seconds.
5. At the conclusion of the test, empty and clean the dust apparatus. Place the spent sample in a bag for archival purposes.

Results.

Thirty-one tests were conducted with PRB coal and eight types of dust control agents. Results for all tests conducted are listed in Table 4.

Results for dust suppression agents that were not treated in the cup or flat plate apparatus were compared with untreated raw coal. Results are summarized in Table 5.

Selected dust control agents were treated in an electrostatic field in the cup charging apparatus or flat plate apparatus. Treated plaster of Paris, pitch coal, and sodium orthophosphate mitigated dust more effectively than untreated materials, as listed in Table 6. These three materials contain water molecules that may have been polarized by the intense electric field.

TABLE 4

Dustiness Test Results

| Run | Sample | Treatment Concentration Weight % | Treatment | Treatment Charging Method | Light Transmittance, % (seconds) | | | | | |
|---|---|---|---|---|---|---|---|---|---|---|
| | | | | | 15 | 30 | 60 | 120 | 300 | 600 |
| 1 | 8-mesh Fresh PRB | 0 | None, Direct from Sample Bag | None | 41 | 52 | 66 | 81 | >100 | |
| 2 | 8-mesh Fresh PRB | 0 | None, Direct from Sample Bag | None | 49 | 58 | 67 | 78 | 95 | 100 |
| 3 | 8-mesh Fresh PRB | 0 | None, Direct from Sample Bag | None | 50 | 58 | 67 | 77 | 91 | 95 |
| 4 | 8-mesh Fresh PRB | 0 | None, Direct from Sample Bag | None | 30 | 36 | 44 | 72 | 72 | 75 |
| 5 | 8-mesh Fresh PRB | 0 | None, Direct from Sample Bag | None | 49 | 59 | 68 | 78 | 94 | 99 |
| 6 | 8-mesh Fresh PRB | 10 | Photocopier Toner | None | 82 | 86 | 90 | 92 | 92 | 93 |
| 7 | 8-mesh Fresh PRB | 5 | Photocopier Toner | None | 92 | 96 | 97 | 98 | 98 | |
| 8 | 8-mesh Fresh PRB | 1 | Photocopier Toner | None | 87 | 92 | | 97 | 98 | |
| 9 | 8-mesh Fresh PRB | 1 | Run 8 Sample, 20 hr Later | None | 89 | 92 | 95 | 96.6 | 99 | |
| 10 | Run 9 | 1 | 312 hr Later | None | 88 | 94 | 97 | 99 | 100 | |
| 11 | Run 10 | 1 | Dried 50° C., 6% Moisture Loss | None | 89 | 92 | 95 | 98 | 99 | 100 |
| 12 | Run 11 | 1 | Tumbled 15 min | None | 65 | 74 | 84 | 93 | 96 | 98 |
| 13 | 8-mesh Fresh PRB | 1 | Photocopier Toner | 25 kV, 1 min, 20° C., cup apparatus | 89 | 92 | 96 | 98 | 100 | |
| 14 | 8-mesh Fresh PRB | 17 | PRB, 48 by 200 Mesh | 20 kV, 15 min, 40° C., cup apparatus | 66 | 74 | 82 | 89 | 95 | 97 |
| 15 | 8-mesh Fresh PRB | 17 | PRB, 48 by 200 Mesh | None | 75 | 84 | 88 | 94 | 98 | |
| 16 | 8-mesh Fresh PRB | 17 | PRB, 48 by 200 Mesh | None | 77 | 84 | 88 | 94 | 98 | |
| 17 | 8-mesh Fresh PRB | 0 | None, Riffled 5 Times | None | 52 | 61 | 71 | 78 | 92 | |
| 18 | 8-mesh Fresh PRB | 1 | Titania | None | 78 | 84 | 89 | 94 | 97 | |
| 19 | 8-mesh Fresh PRB | 1 | Type C Fly Ash | None | 46 | 55 | 64 | 74 | 93 | 95 |
| 20 | 8-mesh Fresh PRB | 1 | Type F Fly Ash | None | 55 | 64 | 73 | 82 | 93 | 96 |
| 21 | 8-mesh Fresh PRB | 1 | Treated Plaster of Paris, 27 kV | 27 kV, 15 min, 20° C., cup apparatus | 70 | 78 | 84 | 89 | 98 | |
| 22 | 8-mesh Fresh PRB | 1 | As-received Plaster of Paris | None | 53 | 62 | 70 | 80 | 99 | |
| 23 | 8-mesh Fresh PRB | 1 | Coal Pitch | None | 54 | 64 | 76 | 82 | 97 | |

TABLE 4-continued

Dustiness Test Results

| Run | Sample | Treatment Concentration Weight % | Treatment | Treatment Charging Method | Light Transmittance, % (seconds) | | | | | |
|---|---|---|---|---|---|---|---|---|---|---|
| | | | | | 15 | 30 | 60 | 120 | 300 | 600 |
| 24 | 8-mesh Fresh PRB | 1 | Coal Pitch | 9 kV/inch, 15 min, 20° C., flat plate apparatus | 66 | 73 | 80 | 85 | 94 | 96 |
| 25 | 8-mesh Fresh PRB | 0 | Dried 1 hr, 50° C. | None | 47 | 61 | 69 | 81 | 91 | 97 |
| 26 | Run 22 | 0 | Tumbled 15 min | None | 27 | 38 | 52 | 65 | 87 | 93 |
| 27 | Run 23 | 1 | Added Photocopier Toner | None | 81 | 88 | 94 | 97 | 99 | 100 |
| 28 | 8-mesh Fresh PRB | 1 | Raw Na3PO4o12H2O | None | 55 | 65 | 75 | 83 | 92 | 96 |
| 29 | 8-mesh Fresh PRB | 1 | Raw Na3PO4o12H2O | 20 kV, 15 min, 20° C., cup apparatus | 64 | 76 | 82 | 87 | 95 | 98 |
| 30 | 8-mesh Fresh PRB | 0.3 | 0.67 g Cling-free Cloth, Tumbled | None | 48 | 57 | 67 | 75 | 90 | 98 |
| 31 | 8-mesh Fresh PRB | 0.3 | 0.53 g Grab It Cloth, Tumbled | None | 57 | 66 | 73 | 82 | 94 | 98 |

TABLE 5

Test Result Summary for Non-Treated Dust Suppression Agents

| Dust Suppression Agent and Concentration | Light Transmittance at 60 sec, %[1] | Dustiness, Change Compared to Untreated Coal at 60 sec[2] |
|---|---|---|
| Toner, 10% | 90 | 32% Decrease |
| Toner, 5% | 97 | 42% Decrease |
| Toner, 1% | 95 | 40% Decrease |
| Type C Fly Ash, 1% | 64 | No Change |
| Type F Fly Ash, 1% | 73 | 7% Decrease |
| TI-PURE TiO2, 1% | 89 | 31% Decrease |
| Plaster of Paris, 1% | 70 | No Change |
| Pitch Coal, 1% | 76 | 12% Decrease |
| Na3PO4o12H2O, 1% | 75 | 10% Decrease |

[1]Higher value indicates less dust.
[2]Untreated raw coal light transmittance was 68% at 60 sec. Less than 5% change after treatment was indicated as no change.

TABLE 6

Dust Suppression Agents Treated by Electrostatic Field

| Dust Suppression Agent | Electrostatic Treatment | Dustiness, Change Compared to Untreated Agent at 1% Concentration (60 sec)[1] |
|---|---|---|
| Toner | Cup Apparatus, 25 kV, 1 min, 20° C. | No Change |
| 48- by 200-mesh PRB Coal | Cup Apparatus, 20 kV, 15 min, 40° C. | No Change |
| Plaster of Paris | Cup Apparatus, 27 kV, 15 min, 20° C. | 20% Decrease |
| Pitch Coal | Flat Plate Apparatus, 9 kV/inch, 15 min, 20° C. | 5% Decrease |
| Na3PO4o12H2O | Cup Apparatus, 20 kV, 15 min 20° C. | 9% Decrease |

[1]Untreated raw coal light transmittance was 68% at 60 sec. Less than 5% change after treatment was indicated as no change.

Conclusions.

The foregoing experimental results support the following conclusions.

1. Electrostatic attraction between the dust control agent and coal dust is the cause of dust suppression.
2. Dust control with toner was effective after 13 days. In addition, significant control was observed after the sample was dried (6% moisture loss) and tumbled in a mill for 15 min.
3. Commercial electret (photocopier toner) was more effective than electrets produced by the cup or flat plate charging devices.
4. Dustiness is highly dependent on particle size distribution, in particular to the concentration of minus 100-mesh particles.
5. Untreated titanium dioxide at a 1% concentration is moderately effective.
6. Treated agents, including plaster of Paris, pitch coal, and sodium orthophosphate, were more effective than their untreated counterparts.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed:

1. A method to control dusting in a bulk material having a first electrostatic charge, comprising:
    separating the bulk material into a first and second fraction;

imparting a second electrostatic charge to the first fraction, wherein the second electrostatic charge is opposite the first electrostatic charge; and mixing the first and second fractions.

2. The method, as claimed in claim 1, wherein the first fraction is less than about 20% by weight of the total bulk material.

3. The method, as claimed in claim 1, further comprising reducing the particle size of the first fraction before the step of imparting.

4. The method, as claimed in claim 1, wherein the step of imparting comprises, placing the first fraction in an electrostatic field of at least about 1 kV/cm;

raising the temperature of the first fraction in the electrostatic field to between about 30° C. and about 300° C.; and maintaining the first fraction in the electrostatic field and at the raised temperature for between about 5 minutes and about 600 minutes.

5. The method, as claimed in claim 1, wherein the step of imparting comprises treating the first fraction with a corona discharge.

6. The method, as claimed in claim 1, wherein the bulk material is a bulk fuel material.

7. The method, as claimed in claim 1, wherein the bulk material is coal selected from the group consisting of bituminous coal, subbituminous coal and lignite.

8. A method of treating a solid particulate material, comprising:

a. separating the material into first and second fractions, wherein the first fraction comprises less than about 10% of the total material;

b. reducing the particle size of the first fraction;

c. placing the first fraction in an electrostatic field of at least about 1 kV/cm;

d. raising the temperature of the first fraction in the electrostatic field to between about 30° C. and about 300° C.;

e. maintaining the first fraction in the electrostatic field and at the raised temperature for between about 5 minutes and about 600 minutes;

f. cooling the first fraction to ambient temperature while maintaining the electrostatic field;

g. removing the first fraction from the electrostatic field when the material temperature is at ambient temperature; and h. mixing the first and second fractions.

9. A method to control dusting in a bulk material having a first electrostatic charge, comprising:

placing a charge control agent in an electrostatic field of at least about 1 kV/cm;

raising the temperature of the charge control agent in the electrostatic field to between about 30° C. and about 300° C.;

maintaining the charge control agent in the electrostatic field and at the raised temperature for between about 5 minutes and about 600 minutes; and, mixing the bulk material with a charge control agent having a second electrostatic charge opposite the first electrostatic charge, wherein the amount of the charge control agent is between about 0.1% and about 20% by weight of the bulk material.

* * * * *